G. F. MITCHELL.
SHRUB AND PLANT TRIMMING MACHINE.
APPLICATION FILED JAN. 13, 1909.

989,388.

Patented Apr. 11, 1911.

2 SHEETS—SHEET 1.

Witnesses
J. P. Hinkel
J. J. McCarthy

Inventor
George F. Mitchell
by Spencer B. Preston
Attorney

G. F. MITCHELL.
SHRUB AND PLANT TRIMMING MACHINE.
APPLICATION FILED JAN. 13, 1909.
989,388.
Patented Apr. 11, 1911.
2 SHEETS—SHEET 2.
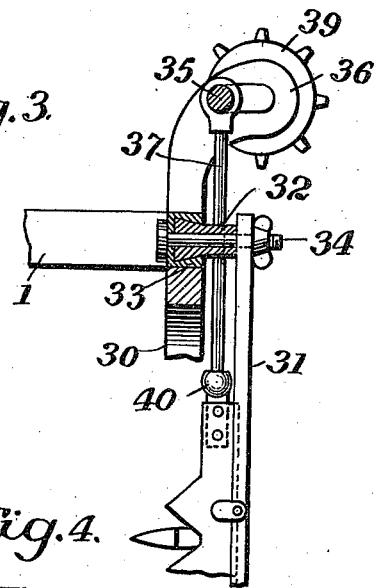
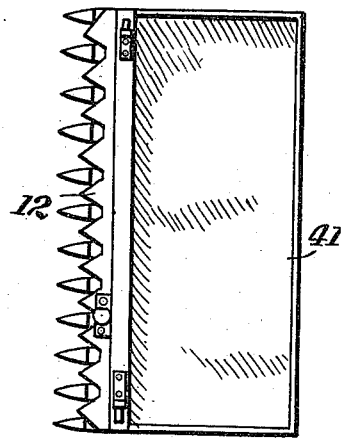
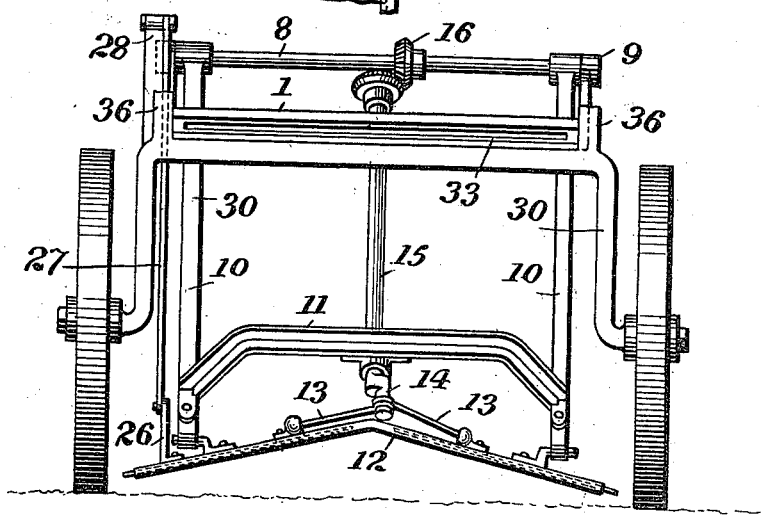
Witnesses
J. P. Hinkel
J. J. McCarthy
Inventor
George F. Mitchell,
by Spencer B. Newton,
Attorney

UNITED STATES PATENT OFFICE.

GEORGE F. MITCHELL, OF SUMMERVILLE, SOUTH CAROLINA.

SHRUB AND PLANT TRIMMING MACHINE.

989,388. Specification of Letters Patent. Patented Apr. 11, 1911.

Application filed January 13, 1909. Serial No. 472,146.

(DEDICATED TO THE PUBLIC.)

*To all whom it may concern:*

Be it known that I, GEORGE F. MITCHELL, an employee of the Department of Agriculture, a citizen of the United States, residing at Summerville, in the county of Dorchester and State of South Carolina, have invented certain new and useful Improvements in Shrub and Plant Trimming Machines, of which the following is a specification.

This application is made under the act of March 3, 1883, Chapter 143 (22 Stat., 625) and the invention herein described and claimed may be used by the Government of the United States or any of its officers or employees in the prosecution of work for the Government, or any person in the United States, without payment to me of any royalty thereon.

My invention relates to pruning or trimming plants, shrubs and bushes, particularly those growing either in rows or checks, and has for its principal object the provision of a machine which will prune or trim the top, or the top and both sides of a row or hedge on a single trip, at will.

A further object is the provision of efficient means for suspending and adjusting the cutter or sickle bars so as to trim at different heights and widths, and also vary the angle of both top and side cuts.

A further object is to provide for the convenient and ready control of the various cutter knives or sickles, and to produce a machine of high efficiency.

In carrying out my invention I construct the frame of the machine of angle iron, to combine strength with lightness, the body of the vehicle being designed to straddle the plant, shrub or bush to be trimmed and to be drawn by animals. The cutters are driven by an engine located on the machine, preferably an internal combustion engine, and controlled by an operator seated on the machine.

The invention will be best understood by reference to the accompanying drawings taken in connection with the following description, in which I have set forth a machine designed primarily for pruning or trimming tea plants. But it will be understood that this machine is also intended and adapted for general use wherever applicable; and is itself only illustrative of the invention which may be carried out in other ways.

Figure 1:
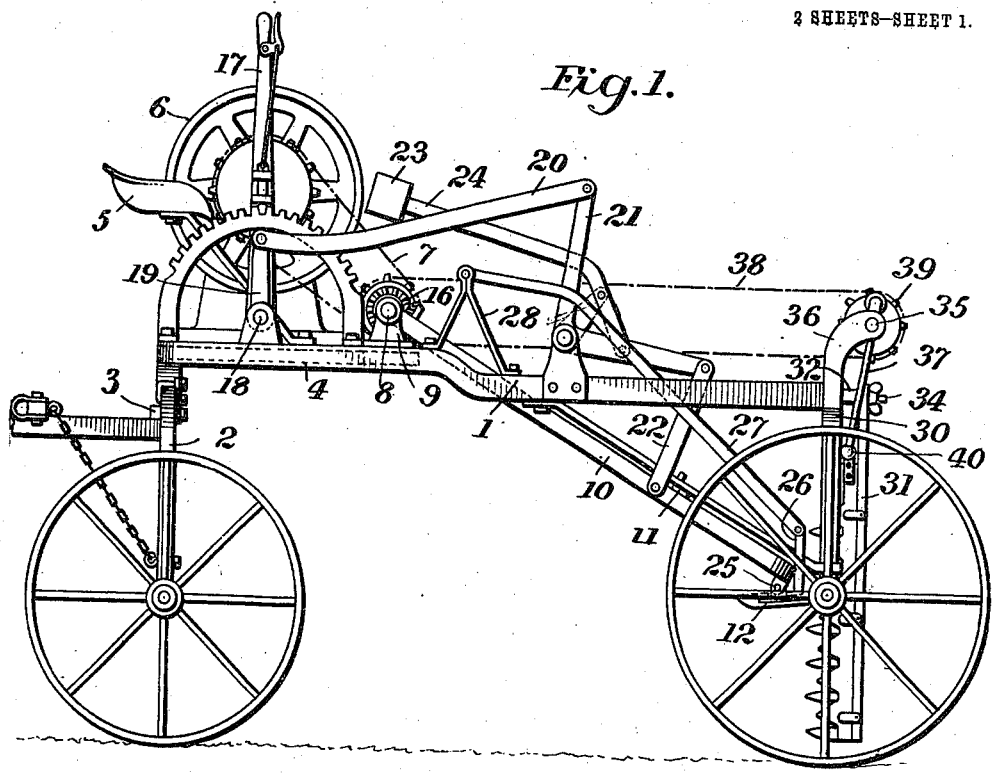
Figure 2:
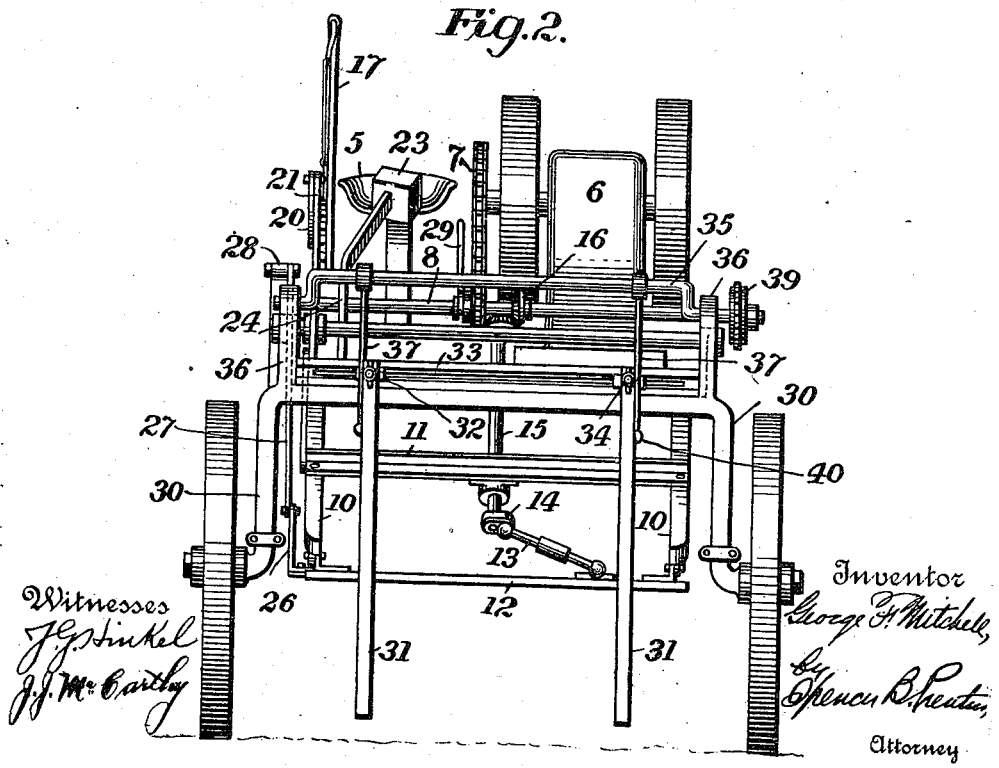

In the drawings, Figure 1 is a side elevation of a machine constructed in accordance with my invention; Fig. 2 is a rear elevation of the same; Fig. 3 is an enlarged detail illustrating the mounting of the side cutters; Fig. 4 is a rear elevation showing a modified form of cutters in position the forward portion of the machine being omitted for clearness; Fig. 5 is a detached view of another modified form of cutter; and Fig. 6 is a plan view of a catching apron for use with the horizontal cutter.

Referring to the drawings, the body frame of the machine is composed of side bars 1 connected by front and rear cross bars, all preferably of angle iron or steel. The front axle 2 is arched to a height of about four feet from the ground and is loosely pivoted to the body frame by bolts 3, to permit motion of the axle in passing over uneven ground without disturbing the level position of the frame.

The forward part of the body frame is provided with a platform 4, on which is mounted the operator's seat 5, and a motor 6, preferably an internal combustion engine, which is geared by sprocket chain 7 with counter-shaft 8 journaled in bearings 9 upon the frame. The details of the motor are omitted to avoid complication of the drawing.

10 is a light swinging frame pivotally mounted on hinges working around the journal boxes of shaft 8, so that said frame swings about the shaft as a center of movement. The side pieces of frame 10 are connected by a brace 11. At the free end of the swinging frame is mounted the cutter 12, shown as a sickle bar and sickle, preferably by lugs 12' detachably engaging stirrups or straps 12'' on frame 10, but may be of any well known or preferred construction. The sickle is operated by a pitman 13 having ball and socket connections and driven through crank 14 by rod 15, which is journaled in the swinging frame and connected by bevel gears 16 with counter-shaft 8. It will thus be seen that the sickle is operatively connected with the motor in all positions of the swinging frame.

The swinging frame 10 is capable of movement from the horizontal to the ground, and is controlled by means of a lever 17 pivoted at 18 and connected by arm 19 and rod 20 with one arm of a bell-crank lever 21. The other arm of the bell-crank lever is connected by link 22 with the swinging frame. A counterbalance weight 23 is mounted upon an arm 24 connected with bell-crank lever 21 to counterbalance the swinging frame.

In order to maintain the cutter 12 at a given uniform angle irrespective of the position of swinging frame, said cutter bar is pivotally mounted at 25 upon the swinging frame and is connected to the body frame by a parallel motion device comprising an arm 26 to which is pivoted a rod 27 which is itself pivoted to bracket 28 upon the body frame. In order to collect the prunings of sickle 12, a frame 41 covered with canvas, shown in Fig. 6, is employed. This is attached to the sickle bar, and receives and retains the prunings until sufficient have been collected to be removed.

The operation of the machine thus far described is as follows: The motor being started, the operator upon seat 5 adjusts the swinging frame 10 by means of lever 17 so as to raise cutters 12 the desired height from the ground. The counter-shaft 8 is then thrown in gear by clutch lever 29, and the cutters begin to operate. The machine is designed to be drawn by horses or other animals, and at any point in its progress the cutters may be adjusted to a different height while in operation or after they have been stopped.

Instead of employing a straight sickle, as shown in Figs. 1 and 2, I may employ a cutter for trimming the top of the hedge or plants at an angle, as shown in Figs. 4 and 5. In Fig. 4 the sickle bar is shown bent downward at an obtuse angle from the middle, and two sickles are used, each connected by a pitman 13 with crank 14, by a ring fitted over the crank. Or an eccentric might be used, the rods being each connected to the outer ring thereof. This cutter will trim the hedge or plant with a sloping roof or gable effect, the inverse of which will be effected by employing the cutter shown in Fig. 5 in which the sickle bar is bent up, instead of down, from the center point. These cutters are interchangeable. The rear axle 30 of the machine is bent up similarly to the front axle, and the machine straddles the hedge or row of plants, as is obvious, the cutter 12 pruning the tops. In order to prune both sides of the hedge or plants at the same time, I provide side cutters 31, shown as sickles mounted in sickle bars as shown in Figs. 1, 2, and 3. One way of mounting these is shown in detail in Fig. 3, and consists of a block 32 dove-tailed into cross bar 33 of the machine and secured by bolt 34. The sickles are driven by a crank 35, journaled at 36, 36, through pitman 37. Crank 35 is operated from counter-shaft 8 by sprocket chain 38 and sprocket 39. The blocks 32 being slidable in cross-bar 33, the vertical cutters may be adjusted in any position to cut the hedge or plant the desired width, and being mounted to swing on bolts 34, may be adjusted so as to cut at any angle to the vertical, the ball and socket connection 40 permitting the operation of the sickles in any adjusted position. It will thus be seen that the machine will trim or prune the top and both sides of a hedge or row of plants simultaneously, and that the angle and amount of cut at all points are readily adjusted.

Having thus described my invention what I claim as new and desire to secure by Letters Patent is:

1. In a shrub trimmer, the combination with the wheels, of the body frame comprising longitudinal and cross-bars, a vertical cutter frame adjustably secured to one of said cross-bars for bodily movement along the same and for relative angular adjustment with respect to the same, vertically arranged knives carried by said cutter frame, and means for driving said knives in any of the adjusted positions of said frame.

2. In a shrub trimmer, the combination with the wheels, of a body-frame comprising longitudinal and cross-bars, a pair of vertical cutter frames adjustably secured to one of said cross-bars for bodily movement along the same, a set of vertically arranged knives carried upon each of said cutter frames, and means including a transverse counter-shaft for driving the knives of each frame in any of their adjusted positions.

3. In a shrub trimmer, the combination with the wheels, of a body-frame comprising longitudinal and cross-bars, a slot or groove in one of said cross-bars, a pair of vertically suspended cutter frames each having a part in slidable engagement with said groove, clamps or nuts for clamping said frames in any position along said bars, cutter knives carried by each frame, and means including a transverse counter-shaft upon the body-frame for driving the knives on each cutter frame in any position of said cutter frames.

In testimony whereof I have affixed my signature, in presence of two witnesses.

GEORGE F. MITCHELL.

Witnesses:
 CHARLES U. SHEPARD,
 R. S. BROOKE.